D. KIRK.
Clips for Vehicles.
No. 200,795.    Patented Feb. 26, 1878.
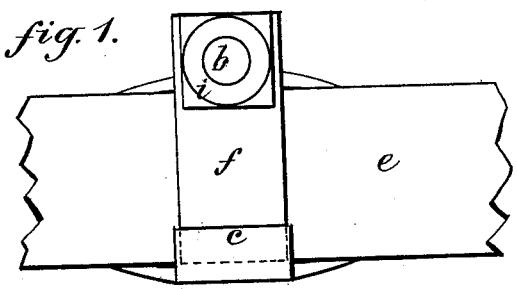
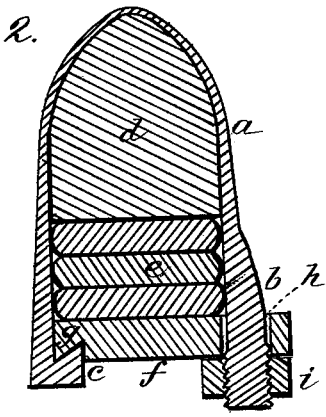
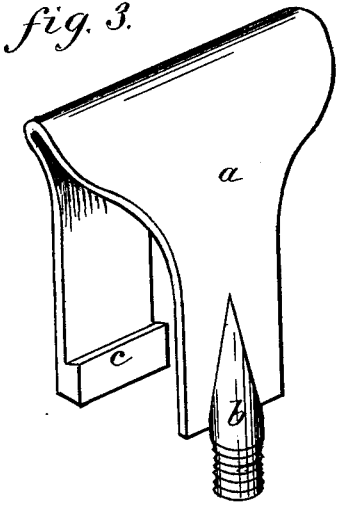
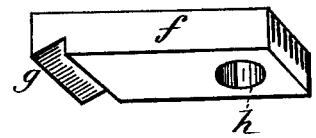
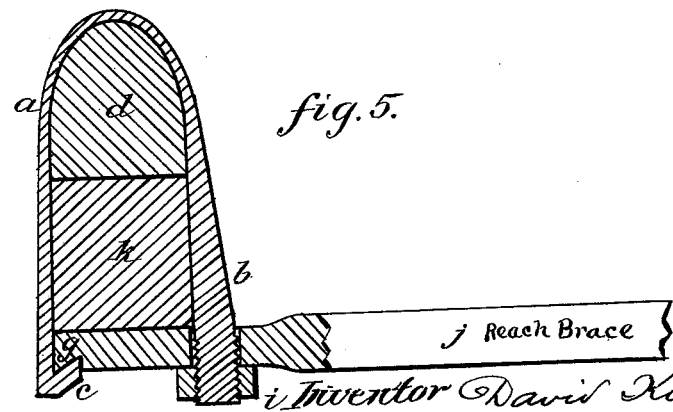

UNITED STATES PATENT OFFICE.

DAVID KIRK, OF ORLEANS, NEW YORK, ASSIGNOR TO WILLIAM A. LAMB, OF SAME PLACE.

IMPROVEMENT IN CLIPS FOR VEHICLES.

Specification forming part of Letters Patent No. 200,795, dated February 26, 1878; application filed July 31, 1877.

*To all whom it may concern:*

Be it known that I, DAVID KIRK, of Orleans, in the county of Ontario and State of New York, have invented certain new and useful Improvements in Clips for Vehicles; and I do hereby declare that the following is a full, clear, and exact description thereof, which will enable others skilled in the art to which it appertains to make and use the same, reference being had to the accompanying drawings, and to letters of reference marked thereon, which form a part of this specification.

My improved clip for vehicles is adapted for clipping the spring-bar to the spring and the axle to the reach-braces. The ordinary clip used for these purposes has screw-threaded ends secured by nuts to a cross-tie plate.

In my improved clip one end terminates in a hook adapted to a cross-plate, having a grooved hook formation corresponding to the form of the hook, for making a lock similar in its action to a half-dovetail, the other end of the cross-tie plate being secured, in the usual manner, to the clip by a screw-nut, thus forming a secure locking or fastening of the parts, and dispensing with a nut and screw-threaded stem, as used in the old way, making a neater finish, and less expensive.

The tie-plate does not project beyond the spring at one end, but lies in its clip-lock flush with the edge of the spring, and against the inner side of one side of the clip, with a smooth plain lock-joint.

In the drawings, Figure 1 represents the clip as applied to the spring and its bar; Fig. 2, a cross-section of the same; Fig. 3, the clip detached; Fig. 4, the clip tie-plate detached; and Fig. 5, a section, showing the manner of clipping one of the reach-braces to the axle.

The clip *a* has one of its shouldered stems *b* screw-threaded, and the other formed into a hook, *c*, and it is applied to the bar *d* and its spring *e*, to secure them together.

The cross-tie plate *f* has one of its ends formed into a hook, *g*, which fits into and locks with the hooked end of the clip in a manner to hold it firmly in place, while the other end of the cross-tie plate has an opening, *h*, to receive the screw-threaded stem *b* of the corresponding side of the clip, and secured by a screw-nut, *i*, making a firm connection.

I prefer to make the locking end of the clip and its tie-plate of the form of a half-dovetail, with the end of said tie-plate lying under and into the projecting hook end of the clip, so that the end of the tie-plate will abut against the inner side of the clip-hook, and make it impossible for the hook end of the tie-plate to turn upon its screw-threaded stem and work out at either side of the hook. The hook-lock therefore saves the projection of the tie-plate at one end, and a nut and screw-threaded stem, and is therefore more simple, and effects a considerable saving in expense and labor in applying the clip, and makes a neater finish.

As before stated, this lock device for the clip can be applied to the braces *j* of the reach, and for this purpose the ends of the braces are formed with the half-dovetail hooks, and secured in the same manner to the clip as that already described, the hook end of the clip extending beneath the axle *k*, and interlocking by the half-dovetail with the hook end of the brace *j*, the other end of the clip being secured by a screw-nut to the screw-threaded end of the clip, as shown in Fig. 5.

By this construction the outer sides of the clips have no projections, and make a smooth appearance.

I have described and shown an interlocking clip-hook formed by a half-dovetail; but it is obvious that any form of hook-connection having the same effect and security would answer the purpose as well, and be within the spirit of my invention.

The manner of applying the hook-lock clip and its tie is as follows, viz: Put the clip down over the part to be clipped, with the tie-plate held in the proper place underneath, at the same time letting the threaded end enter the hole in the tie-plate, and while the clip is left slack the hook end is easily put in the hook of the clip. The nut is then put on and screwed up, and tightens and clamps the hook ends together.

In taking the clip off, unscrew the nut and give the threaded end a light blow with a hammer, when the tie-plate can be pushed around edgewise and easily detached.

I claim—

1. A clip and its tie-plate, united at one of their ends by an interlocking hook.

2. The clip at one end formed with a half-dovetail hook, and the cross-tie, having a corresponding hook formation, for interlocking one with the other, in combination with a screw-threaded stem and nut, for securing the other end of the tie-plate, substantially as described.

In testimony that I claim the foregoing I have affixed my signature in presence of two witnesses.

DAVID KIRK.

Witnesses:
 LEWIS R. LOMBARD,
 JOHN C. WARNER.